United States Patent
Kim et al.

(10) Patent No.: US 9,946,556 B2
(45) Date of Patent: Apr. 17, 2018

(54) MULTILINGUAL INFORMATION GUIDANCE SYSTEM AND DEVICE

(71) Applicant: KOREA AIRPORTS CORPORATION, Seoul (KR)

(72) Inventors: Dong Soo Kim, Gyeonggi-do (KR); Sang Ho Choi, Seoul (KR)

(73) Assignee: KOREA AIRPORTS CORPORATION (KR)

( * ) Notice: Subject to any disclaimer, the term of this patent is extended or adjusted under 35 U.S.C. 154(b) by 75 days.

(21) Appl. No.: 14/974,016

(22) Filed: Dec. 18, 2015

(65) Prior Publication Data
US 2016/0103690 A1    Apr. 14, 2016

Related U.S. Application Data

(63) Continuation of application No. PCT/KR2014/005370, filed on Jun. 18, 2014.

(30) Foreign Application Priority Data

Jun. 19, 2013 (KR) ..................... 10-2013-0070235

(51) Int. Cl.
*G06F 17/00* (2006.01)
*G06K 19/00* (2006.01)
(Continued)

(52) U.S. Cl.
CPC ............ *G06F 9/4448* (2013.01); *G06F 3/167* (2013.01); *G06K 7/1447* (2013.01);
(Continued)

(58) Field of Classification Search
None
See application file for complete search history.

(56) References Cited

U.S. PATENT DOCUMENTS 8,065,134 B2 * 11/2011 Naito ................. G06F 9/4448
704/257
8,397,989 B2 * 3/2013 Wengrovitz ........... G06Q 10/10
235/384
(Continued)

FOREIGN PATENT DOCUMENTS

GB          2484765 A      4/2012
JP       2003-152870 A     5/2003
(Continued)

OTHER PUBLICATIONS

International Search Report and Written Opinion dated Aug. 29, 2014 for PCT/KR2014/005370, 2 pages.

*Primary Examiner* — Fariba Sirjani
(74) *Attorney, Agent, or Firm* — Riverside Law LLP

(57) ABSTRACT

Multilingual information guidance system and device are provided. To elaborate, the system may include: at least one information output device configured to display guidance information to a user; and an information provision server connected to the information output device and configured to provide guidance information prepared in one or more languages to the information output device according to a request of the information output device. The information output device may output guidance information prepared in the native language corresponding to nationality information of a user, which is read from an RFID tag in which the nationality information of the user is stored or transmitted from the information provision server.

18 Claims, 9 Drawing Sheets

(51) Int. Cl.
*H04M 1/00* (2006.01)
*G06F 9/44* (2018.01)
*G09F 25/00* (2006.01)
*G06Q 50/30* (2012.01)
*G06F 3/16* (2006.01)
*G06K 7/14* (2006.01)
*G06K 19/06* (2006.01)
*H04W 4/00* (2018.01)

(52) U.S. Cl.
CPC ....... *G06K 19/06112* (2013.01); *G06Q 50/30* (2013.01); *G09F 25/00* (2013.01); *H04W 4/008* (2013.01)

(56) References Cited

U.S. PATENT DOCUMENTS

| | | | | |
|---|---|---|---|---|
| 8,929,807 | B2* | 1/2015 | Brillhart | H04H 40/00 340/384.7 |
| 9,221,549 | B2* | 12/2015 | Kollakowski | B64D 11/00 |
| 2003/0126013 | A1* | 7/2003 | Shand | G06Q 30/02 705/14.52 |
| 2006/0017545 | A1* | 1/2006 | Volpi | G01S 13/751 340/10.4 |
| 2008/0030300 | A1 | 2/2008 | Naito et al. | |
| 2008/0294424 | A1* | 11/2008 | Naito | G06F 9/4448 704/8 |
| 2009/0015398 | A1* | 1/2009 | Bhogal | A45C 13/42 340/539.13 |
| 2009/0066722 | A1* | 3/2009 | Kriger | G06Q 30/02 345/619 |
| 2011/0284627 | A1* | 11/2011 | Stefani | G06Q 30/0281 235/375 |
| 2012/0066071 | A1* | 3/2012 | Thomas | G06Q 30/02 705/14.66 |
| 2012/0089419 | A1* | 4/2012 | Huster | A61B 5/1115 705/3 |
| 2012/0098642 | A1* | 4/2012 | Krawczewicz | G06K 19/07707 340/10.1 |
| 2013/0052940 | A1* | 2/2013 | Brillhart | H04L 12/189 455/3.06 |
| 2013/0120163 | A1* | 5/2013 | Kollakowski | B64D 11/00 340/945 |

FOREIGN PATENT DOCUMENTS

| | | |
|---|---|---|
| JP | 2011-043898 A | 3/2011 |
| JP | 2012-079321 A | 4/2012 |
| KR | 1020080044056 A | 5/2008 |
| KR | 10-2009-0028180 | 3/2009 |
| KR | 10-2010-0004852 | 1/2010 |
| KR | 20-2011-0001165 | 1/2010 |
| KR | 10-2011-0112516 | 10/2011 |
| WO | 2007018290 A1 | 2/2007 |

* cited by examiner

FIG. 3

| INTERNATIONAL FLIGHT DEPARTURE |||||
|---|---|---|---|---|
| AIRLINE | FLIGHT NO. | SCHEDULED TIME | DESTINATION | ... |
| CCA | CA1123 | 09:30 | SANGHAI | |
| . | . | . | . | |
| . | . | . | . | |

MULTILINGUAL INFORMATION GUIDANCE SYSTEM AND DEVICE

CROSS-REFERENCE TO RELATED APPLICATION

This application is a continuation application claiming benefit to International Patent Application No. PCT/KR2014/005370, filed on Jun. 18, 2014, which is entitled to priority under 35 U.S.C. § 119(a)-(d) to Korea application no. 10-2013-0070235, filed Jun. 19, 2013, each of which application is hereby incorporated herein by reference in its entirety.

TECHNICAL FIELD

The present disclosure relates to a multilingual information guidance system and device.

BACKGROUND

A guidance device that outputs information such as flight schedule or the like in an airport has provided guidance information only in the language of the country where the airport is located or in a few languages of the major countries, such as English language, regardless of nationality or language of a user.

By way of example, a guidance device in Incheon International Airport provides flight schedule information in Korean language, English language, Japanese language, and Chinese language. In this case, users using other languages than the languages used in the guidance device may not understand guidance information or errors may occur. Accordingly, there is a need for a guidance system which displays information translated into the native language corresponding to the nationality of a user and thus enables the user to acquire the information without language discrimination.

In this regard, Korean Patent Laid-open Publication No. 2010-0004852 (entitled "Multilingual automated selection and information system") proposes a system configured to translate a departure or destination city name in a flight or ship schedule into a country code, automatically select a language corresponding to the country code, and automatically broadcast or display guidance information to a user in the selected language.

DISCLOSURE OF THE INVENTION

Problems to be Solved by the Invention

Exemplary embodiments of the present disclosure provide an information guidance system and device configured to automatically provide guidance information translated into the native language corresponding to the nationality of a user. However, problems to be solved by the present disclosure are not limited to the above-described problems, but there may be various other problems to be solved by the present disclosure.

Means for Solving the Problems

In an exemplary embodiment of the present disclosure, a multilingual information guidance system may include: at least one information output device configured to display guidance information to a user; and an information provision server connected to the information output device and configured to provide guidance information prepared in one or more languages to the information output device according to a request of the information output device. The information output device may output guidance information prepared in the native language corresponding to nationality information of a user, which is read from an RFID tag in which the nationality information of the user is stored or transmitted from the information provision server.

Further, in another exemplary embodiment of the present disclosure, an information output device configured to perform multilingual information guidance may include: a storage device in which a guidance information output application for outputting guidance information in many languages is installed; and a processor configured to execute the guidance information output application. The processor may output guidance information prepared in the native language corresponding to nationality information of a user when the guidance information output application is executed.

Effects of the Invention

According to the above-described exemplary embodiments of the present disclosure, it is possible to display guidance information prepared in the native language corresponding to nationality information of a user on at least one information output device, and thus possible to display guidance information in languages corresponding to the nationalities of multiple users, respectively.

Further, according to the above-described exemplary embodiments of the present disclosure, it is possible to set display conditions depending on locations of multiple information output devices, a user movement path, and a ratio of nationalities of multiple users and thus possible to adjust guidance information to be suitable for time and purpose and display the guidance information.

BRIEF DESCRIPTION OF THE DRAWINGS

FIG. 3 is a diagram provided to describe an example where the information output device displays guidance information in a display language automatically set on the basis of information acquired from multiple boarding passes;

MODE FOR CARRYING OUT THE INVENTION

Figure 1:
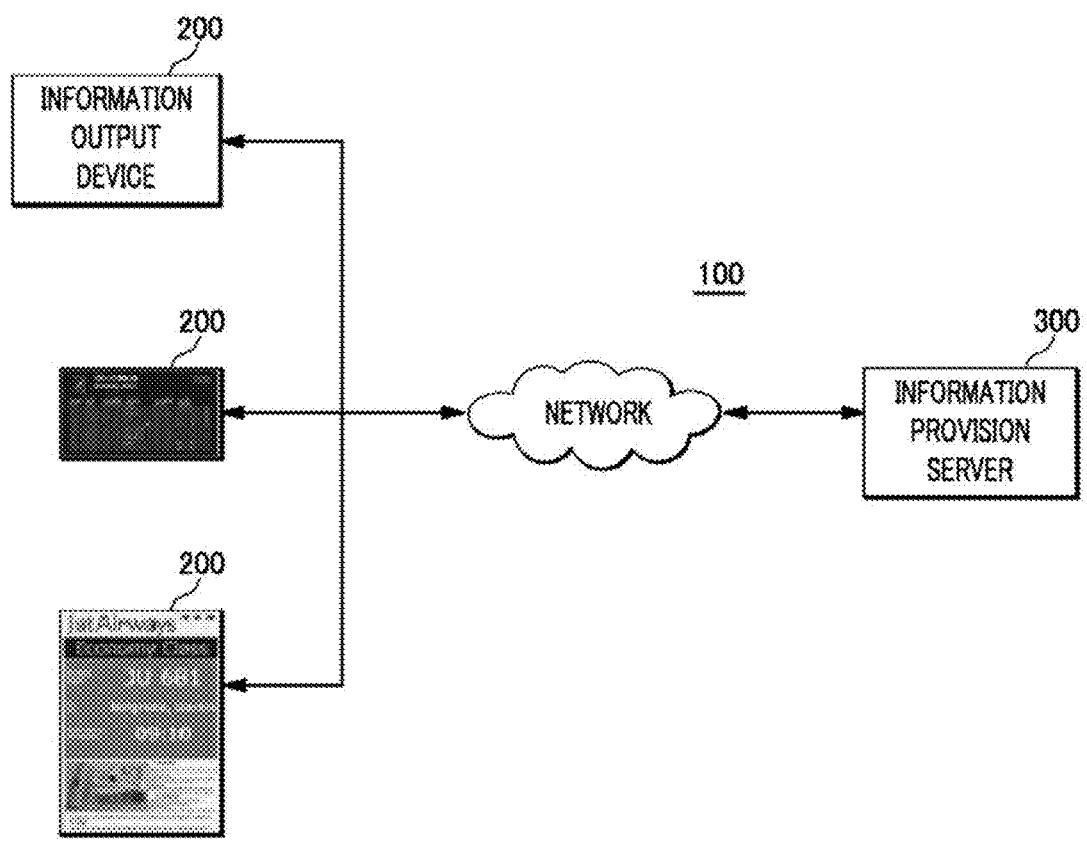
FIG. 1 is a configuration view of a multilingual information guidance system according to an exemplary embodiment of the present disclosure.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements unless context dictates otherwise.

FIG. 1 is a configuration view of a multilingual information guidance system according to an exemplary embodiment of the present disclosure.

A multilingual information guidance system 100 includes an information output device 200 and an information provision server 300.

The information output device 200 is configured to display guidance information on a screen to be seen by a large number of users. The multilingual information guidance system 100 may include at least one information output device 200. The information output device 200 reads nationality information of a user from an RFID tag carried by the user and outputs guidance information prepared in the native language corresponding to the read nationality information of the user. Further, the information output device 200 receives guidance information prepared in the native language corresponding to the read nationality information of the user from the information provision server 300 and outputs the received guidance information.

The information output device 200 may be any information output device configured to provide information in public places providing transports, such as an airport, a terminal, and the like. By way of example, the information output device 200 may be a large screen device which enables a large number of users to check information at the same time. Such a large screen device may include a flight information display system (FIDS) which is arranged in an airport and provides guidance information such as departures and arrivals of airplanes, a baggage information display system (BIDS) which is arranged in a baggage claim area and provides guidance information such as a flight number and an airline of an airplane from which baggage is unloaded, a passenger information display system (PIDS) provided in a public place such as a restaurant, and a check-in information display system (CIDS). Details of the information output device 200 in the form of a large screen device will be described later with reference to FIG. 2 and FIG. 3.

Further, the information output device 200 may include a kiosk, a computer, and a small screen configured to enable each user to check personal information. Details of the information output device 200 in the form of a kiosk or small screen will be described later with reference to FIG. 4 and FIG. 5.

Further, the information output device 200 may be an audio guidance broadcasting device provided in public facilities such as an airport and a terminal or transport means such as an airplane and a bus.

In FIG. 2 to FIG. 9, the information output device 200 will be described as being separated into information output devices 210, 220, and 240. For reference, the multiple information output devices 210, 220, and 240 may be implemented as a single device in the multilingual information guidance system 100 or as at least two devices interworking with each other.

The information provision server 300 is connected to the information output device 200 and configured to provide guidance information prepared in one or more languages to the information output device 200 according to a request of the information output device 200. By way of example, the guidance information may include at least one of nationality information of a user, driving information of transport means, use information of transport means, information about public facilities, tourist information, or advertising information. Herein, the driving information of transport means may include name information of transport means, departure point/destination information, departure/arrival time information, and passenger information including nationality information. In the case of an airplane, the driving information may be included in flight information.

Meanwhile, a network connecting the information output device 200 to the information provision server 300 may be implemented as a wired network such as a Local Area Network (LAN), a Wide Area Network (WAN), or a Value Added Network (VAN), or all kinds of wireless networks such as a mobile radio communication network or a satellite communication network.

Figure 2:
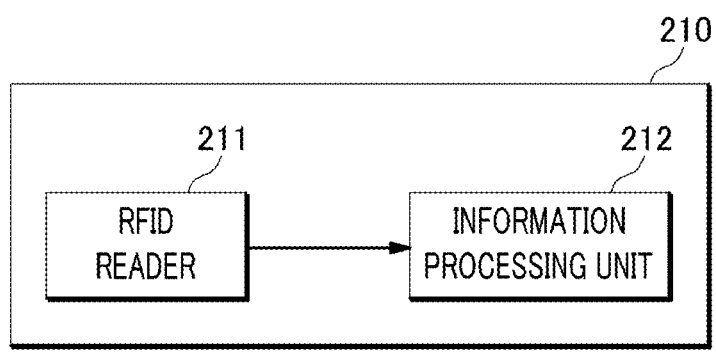
FIG. 2 is a block diagram illustrating a configuration of an information output device according to an exemplary embodiment of the present disclosure.

FIG. 2 is a block diagram illustrating a configuration of an information output device according to an exemplary embodiment of the present disclosure.

FIG. 2 illustrates an example where the information output device 210 is a large screen device such as a flight information display device or a passenger address system.

Further, FIG. 2 illustrates the components of the information output device 210 for multilingual information guidance, but the information output device 210 may further include other processing units (not illustrated) according to a kind and a purpose of the information output device 210.

The information output device 210 includes an RFID reader 211 and an information processing unit 212.

If a user carrying a boarding pass including an RFID tag approaches a communication range, the RFID reader 211 reads information stored in the RFID tag. The RFID stores at least one of nationality information and departure point/destination information of the user. In this case, the RFID reader 211 may read the information by a long-distance RFID tag identification method or a near-field RFID tag identification method. If the RFID reader 211 is of a long-distance identification type, the RFID reader 211 may automatically identify an RFID tag approaching a communication range and read RFID tag information (i.e., nationality information and departure point/destination information of the user). Further, if the RFID reader 211 is of a near-field identification type, the RFID reader 211 may be provided near a main body of the information output device 210 or in the main body and may identify the RFID tag and read information.

The RFID tag may be attached to a passport in addition to the boarding pass. Further, the RFID tag maybe attached to or installed in personal items according to a place or purpose in addition to items, such as a boarding pass or a passport, relevant to boarding to an airplane. That is, the RFID tag may be provided through a personal identification tag (e.g., a name tag, an ID card, etc.) or a personal item (e.g., an RFID tag-attached product or a separate RFID tag) of an airport user or a user of public places (e.g., a tourist spot, an immigration office, etc.) outside an airport rather than a passenger. In the following description, there will be described a "boarding pass" as an object example to which an RFID tag is attached. However, this example is just provided for convenience in explanation, but an object to which the RFID tag is attached may not be limited thereto.

Meanwhile, the RFID tag may further store user identification information in which 3-digit country codes and 11-digit serial numbers are combined. Herein, the number of digits in the user identification information may be set on the basis of the number of the countries around the world and population. That is, since the number of the countries around the world is less than 999, a 3-digit country code may be assigned to each country, and since the highest population in the world is a 10-digit number, an 11-digit serial number may be assigned. By way of example, the user identification information may be in the form of "country code-serial number (000-00000000000)". Such user identification information may be stored in the RFID tag and used to figure out the country of a user and the population of each country.

The information processing unit 212 set display languages and display conditions of guidance information on the basis of nationality information or departure point/destination information read from one or more boarding passes.

The information processing unit 212 determines the native language of a country corresponding to the nationality information read from the boarding passes as a display language. By way of example, if a Russian user moving from a Korean airport to a Chinese airport approaches a communication range of the information output device 210 while carrying a boarding pass, "Russia" is read by the RFID reader 211 as nationality information of the user. Herein, the information processing unit 212 determines Russian language as a display language on the basis of the read nationality information and displays guidance information in Russian language.

If languages of two or more countries are determined as display languages, the information processing unit 212 may set display conditions such as a display time of each of the determined languages, a display frequency, and a display order. Herein, if the two or more display languages are determined, the information processing unit 212 may adjust a display order, a display time, and a display frequency of the guidance information in proportion to an identification order or the number of users.

By way of example, if the RFID reader 211 identifies 10 Korean users, 5 Japanese users, and 3 Russian users moving from a Korean airport to a Chinese airport, the information processing unit 212 sets Korean language, Japanese language, and Russian language as display languages on the basis of the identified nationality information of the users. Further, since the departure point is Korea and the destination is China, the information processing unit 212 may further set Korean language and Chinese language as display languages.

In this case, the information processing unit 212 calculates the number of users for each country and determines that the order of countries with the greatest number of users is Korea, Japan, and Russia. The information processing unit 212 may set time periods for displaying guidance information in many languages in proportion to the numbers of users. That is, the information processing unit 212 may display Korean language for the longest time period, set a time period for displaying Japanese language to be shorter than the time period for displaying Korean language but and longer than Russian language, and set a time period for displaying Russian language to be shorter than the time period for displaying Japanese language. The information processing unit 212 may further set time periods for displaying Korean language and Chinese language as the native languages of the departure point and the destination, respectively.

Further, the information processing unit 212 may set a display order according to the order of boarding passes identified by the RFID reader 211. By way of example, a Russian user, a Japanese user, and a Korean user may be identified in sequence by the RFID reader 211. Therefore, the information processing unit 212 may display Russian language first for a shorter time period in proportion to the number of users than Japanese language and Korean language. Details thereof will be described later with reference to FIG. 3.

Furthermore, the information processing unit 212 may determine nationality information of a user on the basis of the user identification information read from the boarding pass and thus detect the population of each country. That is, the information processing unit 212 may acquire country information of a user and the population of each country on the basis of the user identification information "country code-serial number (000-00000000000)" included in the RFID tag read by the RFID reader 211. The information processing unit 212 may set a display language on the basis of the acquired country information and the population of each country and adjust a display order and a display time.

Meanwhile, the information output device 210 may output guidance information in the form of multilingual voice signals.

To be specific, the information processing unit 212 may extract departure point/destination information included in the RFID tag read by the RFID reader 211, add the extracted departure point/destination information to the previously stored guidance information, and generate and output voice signals. Herein, the information processing unit 212 may set voice signals according to languages based on nationality information of passengers read by the RFID reader 211 and adjust a broadcasting order or broadcasting time of the voice signals in proportion to a ratio of passengers with each nationality.

To be specific, when one or more users approach a communication range of the RFID reader 211, the RFID reader 211 may read nationality information or departure point/destination information from boarding passes including RFID tags and carried by the users, respectively. By way of example, the RFID reader 211 may be provided at a boarding gate of an airplane. In this case, the information processing unit 212 may add departure point/destination information to guidance information "Ladies and Gentlemen. This is Korean Air flight XXXX bound for XXXX. Flying you to your destination is Captain XXX" and generate multilingual guidance information. If passengers include Koreans, Chinese, Russians, French, Korean language, Chinese language, Russian language, and French language may be set as output languages. In this case, guidance information may be broadcast in one or more output languages according to a ratio of passengers with each nationality. For reference, in the case of guidance information with high importance such as departure point/destination information and safety information, languages of the respective countries corresponding to nationality information of all passengers may be set as output languages. That is, a language of a country for a small number of passengers may also be output in the form of voice signals. Thus, it is possible to supplement a conventional in-flight announcement made only in a few languages including English language and also possible to increase the degree of understanding of all passengers about guidance information, and, thus, it is possible to equally provide the guidance information. The guidance information may include an announcement about in-flight safety as prescribed by the laws, an emergency announcement, and a regular in-flight announcement.

The information output device 210 that outputs guidance information in the form of voice signals may be provided in and applied to not only airports and airplanes but also transport means such as ships, buses, and trains. Further, the information output device 210 may also be provided in and applied to public places, such as passenger terminals, bus terminals, and train stations, used by users with various nationalities. If the information output device 210 is provided in a vehicle and the vehicle moves along a specific driving path, guidance information such as road guidance information and tourist spot information may be output on the basis of nationality information of the passengers identified by the RFID reader 211. By way of example, if a vehicle with a Spanish passenger moves from Insa-dong to Gyeongbokgung Palace, road guidance information and tourist spot information corresponding thereto may be output in Spanish language.

FIG. 3 is a diagram provided to describe an example where the information output device displays guidance information in a display language automatically set on the basis of information acquired from multiple boarding passes.

FIG. 3 illustrates that the information output device 210 is a flight information display device configured to output departure information as an example of a large screen device commonly used by multiple users.

A screen output by the information output device 210 may include an item section 310 for displaying flight schedule items such as airlines, flight numbers, scheduled times, and destination information and information sections 320, 330, and 340 for displaying information about respective flights for each item. In this case, if multiple users respectively carrying boarding passes including RFID tags are located in a communication range of the RFID reader 211 provided in or near the information output device 210, the RFID tags of the respective users are identified.

By way of example, if a total of 6 users departing from a Korean airport to a Chinese airport are identified in a communication range of the information output device 210 and include three French users, two Japanese users, and one Russian user and RFID tags of the Russian user, the French user, and the Japanese user, respectively, are identified in sequence, a flight schedule displayed on the information output device 210 may be as follows.

Firstly, French language, Japanese language, and Russian language, which are the native languages of the users, may be set as display languages on the basis of nationality information, and Korean language and Chinese language may be set as display languages on the basis of departure point/destination information. Then, a display time may be set in proportion to the greatest number of users. Herein, a display time for guidance information in French language may be the longest, and display times for Japanese language and Russian language may be decreased in sequence. Lastly, a display order may be Russia language, French language, and Japanese language according to the order of the identified RFID tags. Therefore, in the information section 320 corresponding to information about a flight departing from Korea and arriving at China, guidance information may be displayed in Russian language for 10 seconds, French language for 30 seconds, and Japanese language for 20 seconds according to the display order and the display time. Herein, Korean language and Chinese language corresponding to the departure point/destination information may be further displayed in an arbitrary display order for arbitrary display times. Further, in the other information sections 330 and 340, information about other flights may be output in many languages according to display conditions corresponding to an identification result of RFID tags of their users.

For reference, the information output device 210 may display all of the item section 310 and the information sections 320, 330, and 340 in a display language corresponding to a single nationality. By way of example, if at least one of guidance information is displayed in Russian language according to an identification result of RFID tags of users, flight schedule information about all flights as well as a flight for the users of which the RFID tags are identified may be displayed in Russian language.

Figure 4:
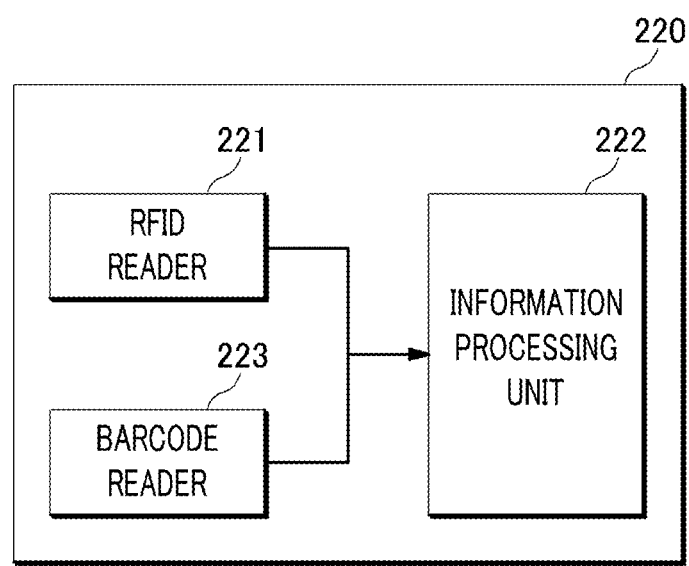
FIG. 4 is a block diagram illustrating a configuration of an information output device according to another exemplary embodiment of the present disclosure.

FIG. 4 is a block diagram illustrating a configuration of an information output device according to another exemplary embodiment of the present disclosure.

FIG. 4 illustrates that the information output device 220 is a kiosk device as an example of a small screen device.

As illustrated in FIG. 4, the information output device 220 includes an RFID reader 221, an information processing unit 222, and a barcode reader 223.

For reference, the information output device 220 may further include other processing units (not illustrated) according to a kind and a purpose of the information output device 220.

When a user approaches a communication range, the RFID reader 221 reads nationality information or departure point/destination information from a boarding pass including an RFID tag and carried by the user. That is, if the RFID tag is identified by the RFID reader 221, the nationality information or departure point/destination information of the user included in the RFID tag is read.

The RFID reader 221 may read the nationality information or departure point/destination information by a long-distance RFID tag identification method or a near-field RFID tag identification method.

The barcode reader 223 reads departure point/destination information from a barcode of the boarding pass in which the departure point/destination information is stored. The departure point/destination information read from the barcode may be used to select a display language of guidance information to be displayed to the user.

The information processing unit 222 may set a display language of guidance information on the basis of a language corresponding to the nationality information or departure point/destination information read from the boarding pass and output the guidance information prepared in the display language on a screen to be seen by the user.

By way of example, if a Russian user approaches the information output device 220 and his/her boarding pass is identified by the RFID reader 221 and the barcode reader 223, "Russia" is read from an RFID tag as nationality information and departure point/destination information of the user is read from the RFID tag or a barcode. Herein, the information processing unit 222 displays guidance information prepared in a display language set according to at least one of Russian language corresponding to the read nationality information and languages corresponding to the departure point/destination information.

Further, the information processing unit 222 may output, on the screen, a pop-up window for selecting at least one of languages corresponding to the nationality information or departure point/destination information as a display language. Herein, the information processing unit 222 may set a language selected by the user through the pop-up window as a display language and output guidance information prepared in the display language on the screen.

For reference, the information processing unit 222 may output at least one of languages corresponding to the departure point/destination information read from the RFID tag or barcode of the boarding pass on a pop-up window as candidate languages for selection. By way of example, if a boarding pass moving from a Korean airport to a China airport is identified by the information output device 220, a pop-up window for selecting Korean language or Chinese language may be displayed. Herein, if a user has Chinese nationality, the user may select Chinese language and check guidance information. Details thereof will be described later with reference to FIG. 5.

The information processing unit 222 may adjust a display time according to a sentence length of guidance information.

By way of example, if a Chinese user carrying a boarding pass including an RFID tag enters into a communication range of the information output device 220, the information output device 220 may display guidance information of which a display language is set to Chinese language on the basis of nationality information of the user after RFID tag identification. Further, while tourist information of which a display language is set to Chinese language is displayed, if a Japanese user enters into the communication range of the information output device 220 and an RFID tag is identified, after a preset display time for Chinese language passes, Japanese language as a next display language according to an identification order may be displayed. Herein, the information processing unit 222 may adjust a display time for each display language according to a sentence length of guidance information prepared in the corresponding display language. That is, even if the same guidance information is prepared in any display language with a longer sentence length, the information processing unit 222 may set a longer display time for the display language.

Further, the information processing unit 222 may output guidance information, of which a display language is set, in the form of voice signals. Since a display order is automatically changed according to an identification order of boarding passes of users, if an output language of voice signals is changed, the information processing unit 222 may first output greetings in each language (for example, "안녕하세요" in Korean language) to inform the users of a change in language of the voice signals. In this case, the information processing unit 222 may set an eye-catching phrase in addition to the greetings to inform the users of a change in language of the voice signals. Such a guidance phrase attracts users' attention and suppresses the users using the corresponding display language from missing information.

Figure 5:
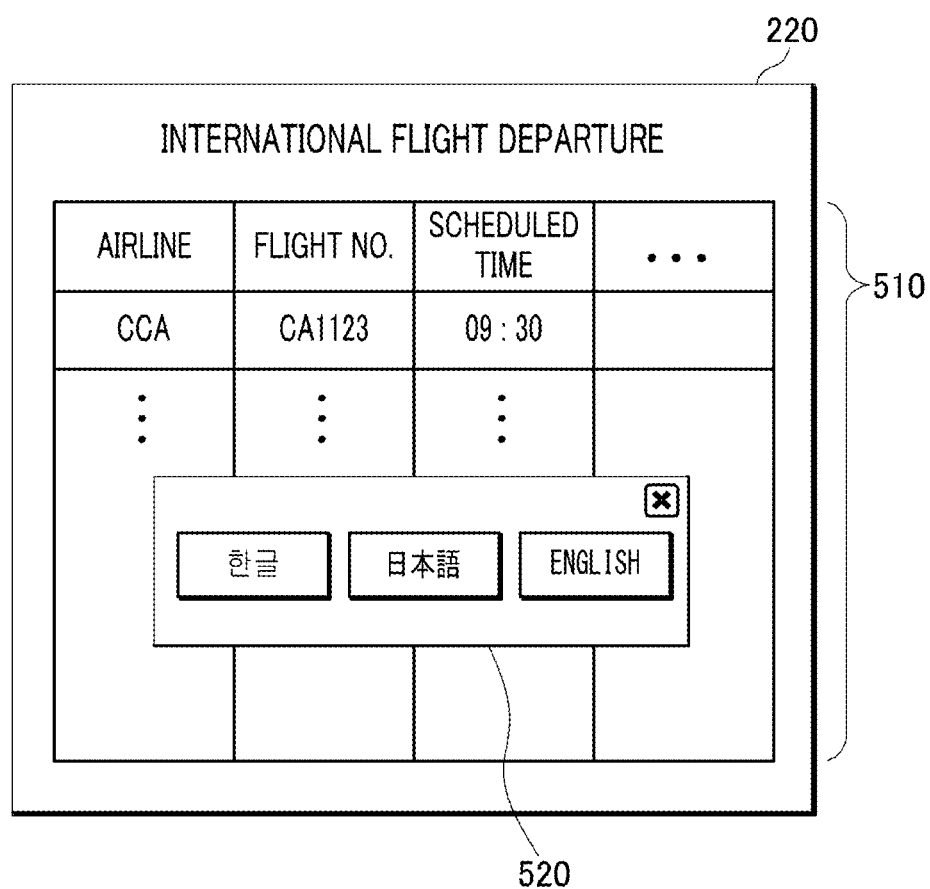
FIG. 5 is a diagram provided to describe an example where the information output device displays guidance information in a display language set according to selection of a user.

FIG. 5 is a diagram provided to describe an example where the information output device displays guidance information in a display language set according to selection of a user.

FIG. 5 illustrates that the information output device 220 is a kiosk device provided in an airport as an example of a small screen device capable of reading a boarding pass of a user by a proximity RFID identification method or a barcode identification method.

A screen output by the information output device 220 may include an information section 510 for displaying guidance information such as airlines, flight numbers, and scheduled times. Herein, if an RFID tag of a boarding pass carried by a user is identified by the RFID reader 221 or a barcode of the boarding pass is identified by the barcode reader 223, nationality information or departure point/destination information of the user included in the RFID tag or barcode is read. The information output device 220 may set languages corresponding to the read nationality information or departure point/destination information of the user as display languages. Herein, the information output device 220 displays the languages corresponding to the read nationality information or departure point/destination information of the user as candidate languages for selection through a pop-up window 520 on a screen. Accordingly, the user may select any one of the display languages relevant to his/her nationality, departure point, destination, and the like.

For reference, the information output device 220 may output a pop-up window including English language, which is the world's common language, as an optional display language in addition to the languages corresponding to the read nationality information or departure point/destination information of the user. By way of example, if a user departs from a Korean airport to a Japanese airport, Korean language and Japanese language can be set as display languages on the basis of departure point/destination information. Herein, if English language is set as a basically settable display language, the pop-up window 520 including Korean language, Japanese language, and English language as a selection menu. Therefore, any user using a language irrelevant to his/her nationality or departure point/destination can check guidance information.

Further, if the information output device 220 is in the form of a kiosk device or an exclusive advertising device, the information output device 220 may further display a section for displaying advertising information within the information section 510. Herein, the information output device 220 may display advertising information prepared in a display language corresponding to nationality information or departure point/destination information included in an RFID tag or barcode. Herein, the advertising information may be advertising information in which an original advertising image is replaced by the set display language or advertising information in which an original advertising image is maintained and subtitle information prepared in the display language is added.

Meanwhile, the original advertising image in the advertising information may also be showing in countries corresponding to the departure point/destination information or in a country corresponding to the nationality information of the user. By way of example, if a boarding pass of a foreign tourist who enters a Korean airport is identified by the information output device 220, the information output device 220 may provide an advertisement of a Japanese car to a Japanese tourist and an advertisement of a movie showing in the U.S. to an American tourist. Thus, it is possible to expose an advertisement to an appropriate target, arouse users' interest, and maximize advertising effects. Further, the information output device 220 may display a Korean cosmetic advertisement according to destination information read from the boarding pass of the foreign tourist entering the Korean airport. In this case, advertising information in which an original advertising image is replaced by Japanese language may be provided to the Japanese tourist and advertising information in which an original advertising image is replaced by English language may be provided to the American tourist according to nationality information of the foreign tourist. Otherwise, advertising information in which Japanese or English subtitle information is added to an original advertising image prepared in Korean language may be provided to the foreign tourist. Thus, it is possible to encourage a foreign tourist to use products of a destination country and visit tourist spots in the destination country and also improve an image of the destination country.

For reference, in the configurations of the information output devices 200, 210, and 220 in accordance with the above-described exemplary embodiments of the present disclosure, at least one component may be cross-included or may be included in each of the information output devices.

Figure 6:
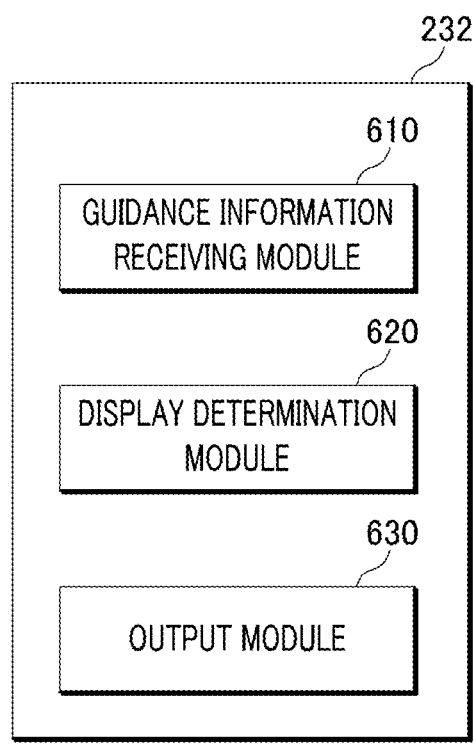
FIG. 6 is a block diagram illustrating a configuration of an information processing unit within an information output device according to yet another exemplary embodiment of the present disclosure.

FIG. 6 is a block diagram illustrating a configuration of an information processing unit within an information output device according to yet another exemplary embodiment of the present disclosure.

FIG. 6 illustrates a detailed configuration of an information processing unit 232 included in the information output device 200 in accordance with yet another exemplary embodiment of the present disclosure. Herein, the information output device 200 in accordance with yet another exemplary embodiment of the present disclosure may include all the components of the information output device 200 described above with reference to FIG. 2. Further, the information processing unit 232 may perform the following process separately from or in association with the process of the information processing unit 212 described above with reference to FIG. 2. The information processing unit 232 includes a guidance information receiving module 610, a display determination module 620, and an output module 630. Further, FIG. 6 illustrates an example where the information output device 200 includes one or more output information devices provided within an airport.

The guidance information receiving module 610 receives guidance information transmitted from the information provision server 300. The display determination module 620 determines display languages and display conditions on the basis of the guidance information received by the guidance information receiving module 610. The output module 630 outputs guidance information according to the display languages and display conditions determined by the display determination module 620.

By way of example, the information output device 200 may be arranged on a common exit path used by users from different transport means.

In this case, the guidance information receiving module 610 receives guidance information including name information of transport means, arrival time information, departure point/destination information, and nationality information of passengers in each of the transport means from the information provision server 300. The display determination module 620 sets a display language and sets nationality rankings in order of a ratio of passengers in each of the transport means on the basis of nationality information of passengers in each of the transport means among the received guidance information. Further, the display determination module 620 may differentially set display conditions such as display times and display frequencies of display languages according to the nationality rankings to be gradually decreased from the highest ranking nationality. In this case, if the number of passengers with the lowest ranking nationality is lower than a predetermined minimum ratio with respect to all the passengers, the display determination module 620 may exclude the corresponding national information from the nationality rankings. Further, if a ratio of the passengers with the lowest ranking nationality is within a predetermined range of the number of passengers as compared with a ratio of passengers with a second-lowest ranking nationality, the display determination module 620 may include the lowest ranking nationality in the nationality rankings. Furthermore, if an honored guest such as a VIP (e.g., a head of state) subject to special management gets on a transport means, nationality information of the honored guest may be included in the nationality rankings regardless of a ratio of the passengers.

By way of example, if the information output device 200 is provided on the common exit path and displays guidance information to passengers of airplanes A and B moving along the same movement path, the display determination module 620 may collect nationality information of all the passengers of the airplanes A and B and rank nationalities by calculating a ratio of passengers with each nationality. Herein, in the case of the information output device 200 provided on a path where another airplane C starts to join, the display determination module 620 may collect nationality information of all the passengers of the airplanes A, B, and C and differentially set display conditions according to nationality rankings. Details thereof will be described later with reference to FIG. 7.

Further, the display determination module 620 may set subtitles prepared in display languages respectively corresponding to two or more nationalities included in the nationality rankings to be displayed at the same time. In this case, while the display languages respectively corresponding to the nationalities are displayed in order of ranking according to the display conditions, the display determination module 620 may also display subtitle information prepared in a language corresponding to at least one nationality (for example, any nationality from the highest ranking to a certain ranking) irrelevant to the displayed languages. By way of example, if the information output device 200 displays advertising information as guidance information, the display determination module 620 may add subtitle information prepared in languages of the respective countries included in the nationality rankings to an original advertising image being displayed in a display language corresponding to any nationality and display the added subtitle information.

Meanwhile, the display determination module 620 may calculate an average movement time of passengers with respect to a walking distance including an independent getting-off zone for each transport means and a common exit path and set a time for terminating display of guidance information on the basis of arrival time information of each transport means and the average movement time of passengers with respect to the walking distance.

By way of example, as for the common exit path where the passengers of the airplanes A and B move along the same movement path, an average movement time with respect to a walking distance including from a getting-off zone for the airplane A to an end point of the common exit path may be assumed as 45 minutes and an average movement time with respect to a walking distance including from a getting-off zone for the airplane B to an end point of the common exit path may be assumed as 30 minutes. If the airplanes A and B arrive at the same time, the display determination module 620 may display languages reflecting nationality information of all the passengers of the airplanes A and B for 30 minutes. 30 minutes later, the display determination module 620 may terminates reflection of nationality information of the passengers of the airplane B according to the calculated average movement time for the airplane B and display languages reflecting only nationality information of the passengers of the airplane A for 15 minutes. Then, 15 minutes later, the display determination module 620 may consider all the passengers of the airplanes A and B as being out of the common exit path and terminate display of guidance information. For reference, the information output device 200 may turn off the screen when terminating the display for power saving and may automatically turn on the screen to display guidance information when an airplane arrives. Details thereof will be described later with reference to FIG. 7.

Further, if a single transport means departs or arrives, the display determination module 620 may adjust display languages and display conditions of guidance information according to arrival time information of the transport means. By way of example, if a single airplane arrives in a specific time zone, all the information output devices 200 within the airport may display guidance information prepared in display languages set according to nationality information of passengers at the arrival time of the airplane.

In this case, the display determination module 620 may output the guidance information set in the display languages in the form of voice signals. That is, the display determination module 620 outputs the guidance information set according to the nationality information of the users in the form of voice and thus enables the users to be aware of the guidance information by the voice.

In another example, the information output device 200 may be arranged at each booth in an immigration checkpoint. In this case, the guidance information receiving module 610 receives guidance information including name information of transport means, departure point/destination information of transport means, and nationality information of passengers in each of the transport means from the information provision server 300. The display determination module 620 sets display languages and display conditions of guidance information on the basis of the received guidance information.

The display determination module 620 may calculate a ratio of passengers with each nationality on the basis of nationality information of the passengers included in the guidance information for each transport means and adjust a display time in proportion to the ratio of passengers with each nationality. Herein, the display determination module 620 adjusts display conditions to differentially assign the number of booths provided with guidance in a display language corresponding to any nationality according to the ratio of passengers with each nationality and may set the greatest number of booths to be assigned to a nationality corresponding to the highest ratio of passengers with each nationality. By way of example, if 50 Koreans, 30 Americans, and 10 Chinese are processed by immigration through a total of seven booths, the display determination module 620 may display guidance information by adjusting display languages and display conditions for the respective booths to assign four booths to the Koreans with the highest ratio of passengers, two booths to the Americans, and one booth to the Chinese.

That is, a booth for each country may be assigned by displaying a language of the corresponding country on the information output device 200 provided at the booth, and a passenger may move to a booth displayed in his/her language and then go through immigration. Thus, it is possible to equally distribute booths according to the number of passengers and thus possible to reduce the time to go through immigration. Further, it is possible to reduce passengers' fear of foreign language during an immigration process and it is possible for an examiner to efficiently perform immigration process to passengers with a single nationality. Furthermore, guidance information may include preparation items for immigration. Since the guidance information is displayed in a language corresponding to a nationality of passengers, it is possible to avoid making an error in transferring information. Details thereof will be described later with reference to FIG. 8.

Further, the display determination module 620 may output the guidance information set in the display language in the form of voice signals. That is, the display determination module 620 outputs the guidance information set according to the nationality information of the users in the form of voice and thus enables the users to be aware of the guidance information by the voice. In this case, since voice signals for each language are automatically changed according to display conditions, when the voice signals are changed, greetings in each language (for example, " 안녕하세요 " in Korean language) may be output first to inform the users of a change in the voice signals. In this case, an eye-catching phrase may be set in addition to the greetings. Such guidance information attracts users' attention and suppresses the users from missing information.

Figure 7:
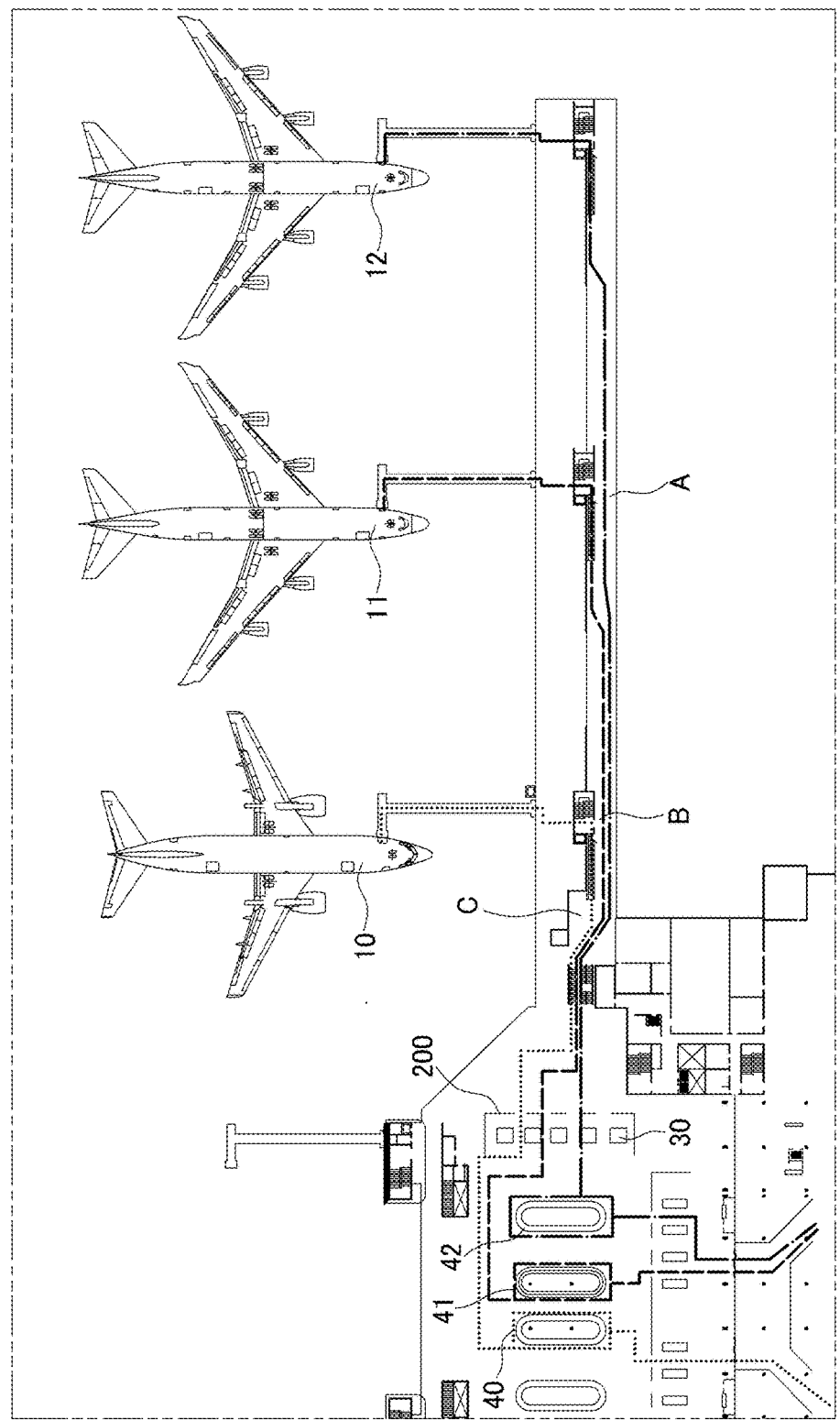
FIG. 7 is a diagram provided to describe an example where guidance information is displayed by multiple information output devices provided on a common exit path.

FIG. 7 is a diagram provided to describe an example where guidance information is displayed along a common exit path used by users from different transport means in accordance with an exemplary embodiment of the present disclosure.

In the exemplary embodiment of the present disclosure, there will be described an example where the information output device 200 includes one or more information output devices provided within an airport.

FIG. 7 illustrates an example where three airplanes 10, 11, and 12 arrive at or around the same time. In the exemplary embodiment of the present disclosure, display conditions for displaying guidance information to passengers of the airplanes 10, 11, and 12 from a common exit path to a carousel 40 may be adjusted as follows.

Firstly, the information output device 200 provided from the first airplane 12 to a point A may rank nationalities on the basis of nationality information of passengers of the first airplane 12 who will move to the point A. Herein, the nationalities are ranked according to a ratio of passengers with each nationality by calculating the number of passengers with each nationality among all the passengers on the basis of nationality information of passengers of each transport means included in guidance information received from the information provision server 300. Further, it is possible to differentially set display conditions such as display times and display frequencies according to the nationality rankings and also possible to set the longest time and the highest frequency to the highest ranking nationality. By way of example, if Korea is ranked first, China is ranked second and Japan is ranked third in nationality rankings of the passengers of the first airplane 12, it is possible to set guidance information prepared in Korean language to be displayed with the highest frequency or for the longest time.

A path from the point A to a point B is a movement path commonly used by the passengers of the second airplane 11 and the first airplane 12. Thus, the information output device 200 provided from the point A to the point B may rank nationalities on the basis of country information of all the passengers of the second airplane 11 and the first airplane 12. By way of example, although Korea is ranked first, China is ranked second and Japan is ranked third in the nationality rankings with respect to the path to the point A, nationality rankings with respect to the path from the point A to the point B may be different due to addition of nationality information of the passengers of the second airplane 11. If China is ranked first, Korea is ranked second and Japan is ranked third in the nationality rankings, the information output device 200 provided from the point A to the point B may set guidance information prepared in Chinese language to be displayed with the highest frequency or for the longest time.

Further, a path from the point B to a point C is a movement path commonly used by the passengers of the third airplane 10, the second airplane 11 and the first airplane 12. Thus, the information output device 200 provided from the point B to the point C may rank nationalities on the basis of country information of all the passengers of the third airplane 10, the second airplane 11 and the first airplane 12. By way of example, although China is ranked first, Korea is ranked second and Japan is ranked third in the nationality rankings with respect to the path to the point B, nationality rankings with respect to the path from the point B to the point C may be different due to addition of nationality information of the passengers of the third airplane 10. If Japan is ranked first, Korea is ranked second and China is ranked third in the nationality rankings, the information output device 200 provided from the point B to the point C may set guidance information prepared in Japanese language to be displayed with the highest frequency or for the longest time.

Herein, if a passenger moves using facilities such as an escalator or a moving walk on the common exit path, guidance information for safety of the passenger may be output in many languages. By way of example, if the passenger uses an escalator, when the passenger gets on the escalator, guidance information such as "Hold on to a handrail in operation" may be output. Such guidance information may be provided in a language corresponding to nationality information of the passenger by identifying an RFID tag carried by the passenger.

Further, when baggage is provided to passengers from carousels 40, 41, and 42, guidance information may be output in many languages. By way of example, if the carousels 40, 41, and 42 start operation at the same time when baggage is put on a conveyor belt, guidance information for suppressing confusion over baggage between passengers may be provided. Such guidance information may be provided in languages corresponding to the respective nationalities according to a ratio of passengers with each nationality. Further, a notice to be announced to users may be displayed on the information output devices 200 provided at the carousels 40, 41, and 42 assigned to the first to third airplanes 10, 11, and 12, respectively. By way of example, all the passengers of the third airplane 10 pick up their baggage from the third carousel 40 and all the passengers of the second airplane 11 pick up their baggage from the second carousel 41, and, thus, the third carousel 40 may set display languages on the basis of nationality information of the passengers of the third airplane 10 and the second carousel 41 may set display languages on the basis of nationality information of the passengers of the second airplane 11. When the information output device 200 at the third carousel 40 displays guidance information such as "You should declare anything over $400 and then pay an appropriate tax", if Russia is ranked first, Britain is ranked second and France is ranked third in nationality rankings, it is possible to set guidance information prepared in Russian language to be displayed with the highest frequency or for the longest time.

Meanwhile, when movement of the passengers is terminated, the information output device 200 may terminate display of the guidance information. The information output device 200 may calculate an average movement time of passengers with respect to a walking distance including an independent getting-off zone for each transport means and a common exit path and adjust a time for terminating display of guidance information on the basis of arrival time information of each transport means and the average movement time of passengers with respect to the walking distance.

By way of example, as illustrated in FIG. 7, passengers starting from arrival points of the first to third airplanes 10, 11, and 12 may enter a country to the point C or the carousels 40, 41, and 42, respectively, through the common exit path. If average movement times with respect to walking distances from getting-off zones for the respective airplanes to the point C are 15 minutes for the airplane 12, 10 minutes for the airplane 11, and 5 minutes for the airplane 10, when the three airplanes arrive at the same time, the information output device 200 provided from the point B to the point C may select display languages on the basis of nationality information of the passengers of the three airplanes 10, 11, and 12 in 5 minutes. Then, 5 minutes later, display languages corresponding to the nationality information of the passengers except the passengers of the third airplane 10 may be output. 10 minutes later, display languages corresponding to the nationality information of the passengers except the passengers of the second airplane 11 may be output. 15 minutes later, all the passengers of the three airplanes 10, 11, and 12 are considered as being out of the path, and, thus, display of guidance information may be terminated. In this case, the screen of the information output device 200 may be turned off for power saving and may be automatically turned on when an airplane arrives.

Figure 8:
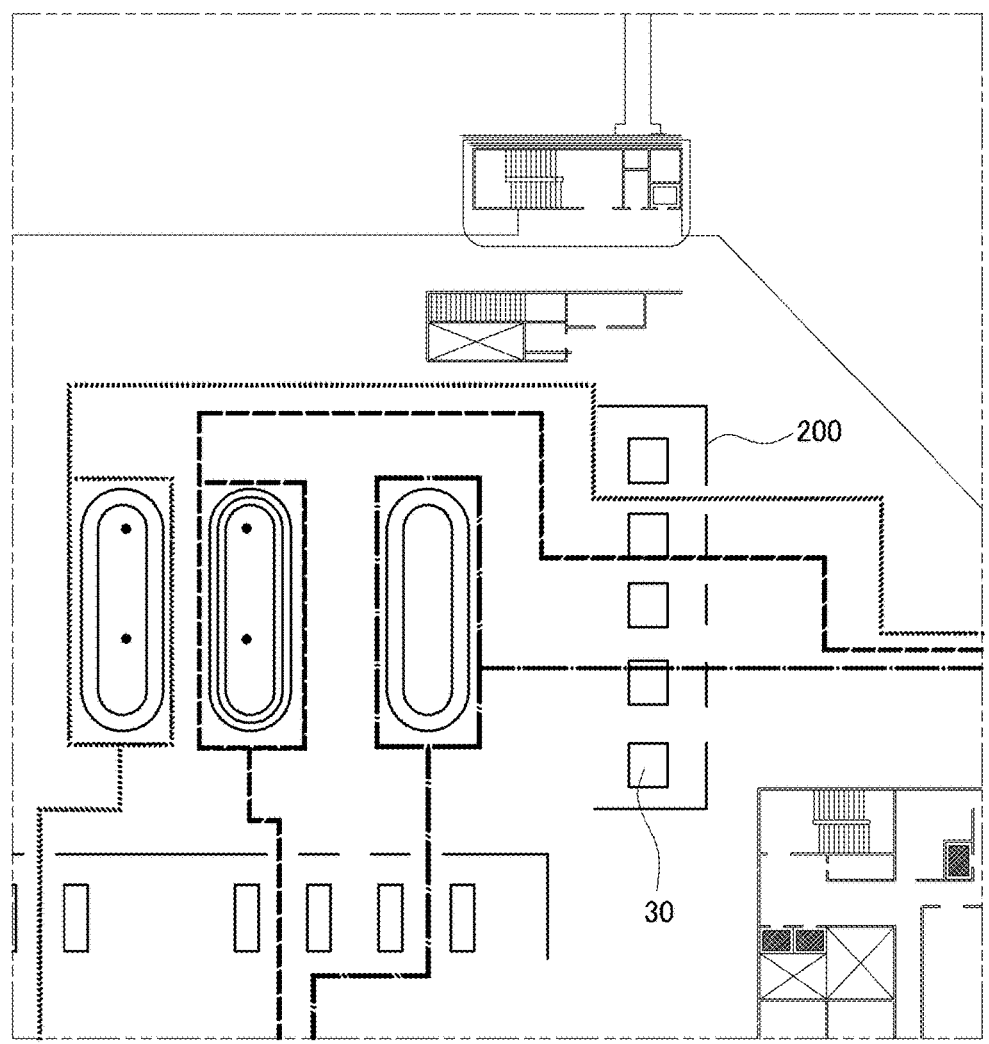
FIG. 8 is a diagram provided to describe an example where guidance information is displayed by an information output device arranged at a counter in an immigration checkpoint.

FIG. 8 is a diagram provided to describe an example of an information output device arranged at each booth in an immigration checkpoint according to an exemplary embodiment of the present disclosure.

In the exemplary embodiment of the present disclosure, there will be described an example where the information output device 200 includes one or more information output devices provided within an airport.

Display conditions for displaying guidance information to passengers from the information output device 200 provided at an immigration booth 30 illustrated in FIG. 8 may be adjusted as follows.

By way of example, if 50 Koreans, 10 Americans, and 20 Chinese are processed by immigration through a total of five immigration booths 30, it is possible to adjust display conditions for the respective booths to assign three booths to the Koreans with the highest ratio of passengers with each nationality, one booth to the Americans, and one booth to the Chinese. That is, the information output devices 200 respectively provided at the five immigration booths 30 includes three information output devices 200 in which Korean language is set as a display language, one information output device 200 in which English language is set as a display language, and one information output device 200 in which Chinese language is set as a display language, and, thus, a passenger may move to the immigration booth 30 displayed in his/her language and then go through immigration. Thus, it is possible to equally distribute immigration booths 30 according to the number of passengers and thus possible to reduce the time to go through immigration. Further, it is possible to reduce passengers' fear of foreign language during an immigration process and it is possible for an examiner to efficiently perform immigration process to passengers with a single nationality. Furthermore, guidance information may include preparation items for immigration. Since the guidance information is displayed in a language corresponding to a nationality of passengers, it is possible to avoid making an error in transferring information.

Figure 9:
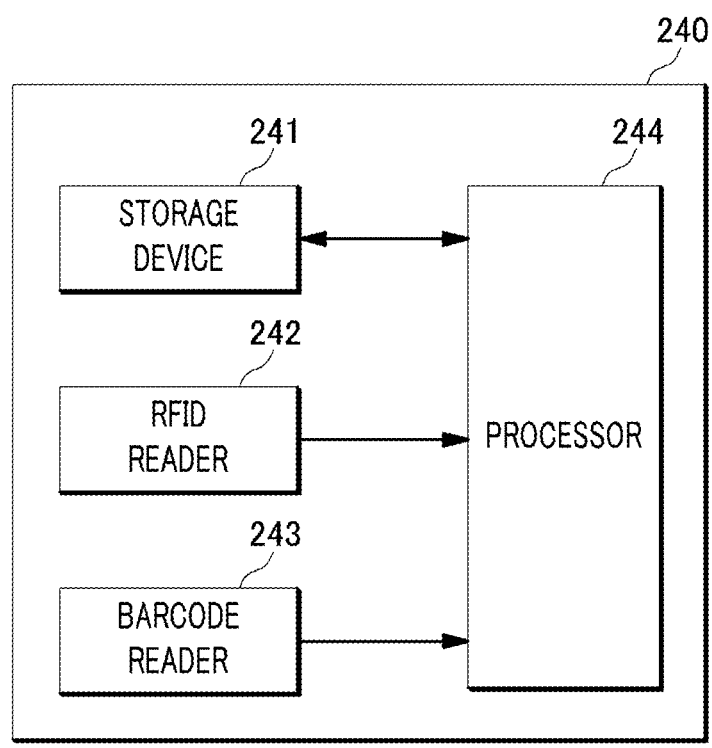
FIG. 9 is a block diagram illustrating a configuration of an information output device according to still another exemplary embodiment of the present disclosure.

FIG. 1 to FIG. 8 illustrate various examples of the information output device of the information guidance system according to the exemplary embodiments of the present disclosure. In FIG. 9, an information output device according to still another exemplary embodiment of the present disclosure will be described in more detail.

FIG. 9 is a configuration view of an information output device according to still another exemplary embodiment of the present disclosure.

The information output device 240 according to the exemplary embodiment of the present disclosure includes a storage device 241, an RFID reader 242, a barcode reader 243, and a processor 244.

In the storage device 241, a guidance information output application for outputting guidance information in many languages may be installed.

The processor 244 executes the guidance information output application and outputs guidance information prepared in a language corresponding to nationality information of a user when the guidance information output application is executed.

Meanwhile, the information output device 240 may further include the RFID reader 242 capable of reading nationality information or departure point/destination information of one or more users from boarding passes including RFID tags in which the nationality information or departure point/destination information is stored when the users approach a communication range. In this case, the processor 242 may adjust display languages and display conditions on the basis of the nationality information or departure point/destination information read from the one or more boarding passes.

Further, the information output device 240 may further include the barcode reader 243 capable of reading departure point/destination information from a barcode of a boarding pass in which departure point/destination information is stored. In this case, the processor 244 may select, as a display language, at least one of languages of countries corresponding to the departure point/destination information read from the barcode.

Further, the processor 244 may output a pop-up window for selecting, as a translated language, at least one of languages of countries corresponding to the nationality information or departure point/destination information to be provided to a user, and display guidance information set in a display language selected through the pop-up window to the user.

Furthermore, the information output device 200 may be provided on a common exit path used by passengers of different transport means. In this case, the processor 244 may adjust display languages and display conditions of guidance information on the basis of name information of transport means, arrival time information, departure point/destination information of transport means, and nationality information of passengers in each of the transport means included in the guidance information received from the information provision server.

Further, the information output device 200 may be arranged at each booth in an immigration checkpoint. In this case, the processor 244 may adjust display languages and display conditions of guidance information on the basis of name information of transport means, departure point/destination information of transport means, and nationality information of passengers in each of the transport means included in the guidance information received from the information provision server.

Furthermore, the information output device 200 may output guidance information in the form of voice signals. In this case, the processor 244 may extract departure point/destination information, add the extracted departure point/destination information to the previously stored guidance information, and generate and output voice signals.

The illustrative embodiments can be embodied in a storage medium including instruction codes executable by a computer or processor such as a program module executed by the computer or processor. A data structure in accordance with the illustrative embodiments can be stored in the storage medium executable by the computer or processor. A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as a computer-readable instruction code, a data structure, a program module or other data. The communication medium typically includes the computer-readable instruction code, the data structure, the program module, or other data of a modulated data signal such as a carrier wave, or other transmission mechanism, and includes information transmission mediums.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. A multilingual information guidance system comprising:
    at least one information output device configured to display guidance information to be seen by one or more users; and
    an information provision server connected to the information output device and configured to provide guidance information prepared in one or more languages to the information output device according to a request of the information output device,
    wherein the information output device outputs guidance information prepared in the native language corresponding to nationality information of a plurality of users, which is read from an RFID tag carried by the plurality of users the information output device, at paths used by passengers, sets display conditions of display languages of the guidance information according to a ratio of nationality of the plurality of users and sets a display language corresponding to a high ratio of nationality to be displayed for a long display time or with a high frequency, and wherein the information output device is arranged on a common exit path used by passengers of different transport means, the information output device includes an information processing unit configured to adjust display languages and display conditions of the guidance information on the basis of the guidance information received from the information provision server, and the information processing unit sets nationality rankings in order of a ratio of passengers with each nationality on the basis of nationality information of passengers in each of the transport means, and adjusts display conditions for each of the nationality rankings, wherein the information processing unit calculates an average movement time of passengers with respect to a walking distance including an independent getting-off zone for each transport means and the common exit path, and adjusts a time for terminating display of the guidance information on the basis of the arrival time information of each of the transport means and the average movement time of the passengers with respect to the walking distance, and adjusts display languages and display conditions of the guidance information on the basis of nationality information of passengers of the transport means when departure or arrival of a transport means is determined according to the arrival time information.

2. The multilingual information guidance system of claim 1,
wherein the RFID tag stores nationality information or departure point/destination information of a user, and
the information output device further includes:
an RFID reader configured to read nationality information or departure point/destination information of one or more users from boarding passes each including the RFID tag when the plurality of users approaches a preset communication range;
wherein the information processing unit configured to set display languages and display conditions of the guidance information on the basis of the nationality information or departure point/destination information read from the one or more boarding passes.

3. The multilingual information guidance system of claim 2,
wherein the RFID tag further includes user identification information in which 3-digit country codes and 11-digit serial numbers are combined, and
the information processing unit acquires nationality information of a user and the number of users with each nationality on the basis of the user identification information read from the boarding passes.

4. The multilingual information guidance system of claim 2,
wherein the RFID reader reads the nationality information or departure point/destination information by long-distance RFID tag identification or near-field RFID tag identification.

5. The multilingual information guidance system of claim 2,
wherein the information output device further includes a barcode reader configured to read departure point/destination information stored in a barcode of the boarding passes, and
the information processing unit sets at least one of languages of countries corresponding to the departure point/destination information read from the barcode as a display language.

6. The multilingual information guidance system of claim 1,
wherein the information processing unit displays a pop-up window for selecting, as a translated language, at least one of languages of countries corresponding to the nationality information or departure point/destination information, and displays guidance information translated into a display language selected through the pop-up window.

7. The multilingual information guidance system of claim 1,
wherein the information processing unit sets a display order of the guidance information according to an identification order of the nationality information or departure point/destination information and adjusts a display time according to a sentence length of the guidance information.

8. The multilingual information guidance system of claim 1,
wherein the information processing unit outputs the guidance information in the form of voice signals set in the display language.

9. The multilingual information guidance system of claim 1,
wherein the information processing unit outputs the guidance information in the form of voice signals set in the display language.

10. The multilingual information guidance system of claim 1,
wherein the information output device outputs the guidance information in the form of voice signals, and
the information processing unit extracts departure point/destination information, adds the extracted departure point/destination information to previously stored guidance information, and outputs voice signals.

11. The multilingual information guidance system of claim 10,
wherein the information processing unit sets one or more voice signals according to languages of passengers based on the nationality information, and adjusts a broadcasting order or broadcasting time of the voice signals in proportion to a ratio of passengers with each nationality.

12. The multilingual information guidance system of claim 10, further comprising:
an RFID reader configured to read nationality information or departure point/destination information of one or more users from boarding passes each including an RFID tag in which the nationality information or departure point/destination information is stored when the plurality of users approach a communication range,
wherein the information processing unit sets one or more voice signals according to languages of passengers based on the nationality information, and adjusts a broadcasting order or broadcasting time of the voice signals in proportion to a ratio of passengers.

13. The multilingual information guidance system of claim 1, wherein the guidance information includes at least one of driving information of transport means, use information of transport means, information about public facilities, tourist information, and advertising information.

14. A multilingual information guidance system comprising,
at least one information output device configured to display guidance information to be seen by one or more users; and
an information provision server connected to the information output device and configured to provide guidance information prepared in one or more languages to the information output device according to a request of the information output device,
wherein the information output device outputs guidance information prepared in the native language corresponding to nationality information of a plurality of users, which is read from an RFID tag carried by the plurality of users,
the information output device, at paths used by passengers, sets display conditions of display languages of the guidance information according to a ratio of nationality of the plurality of users and sets a display language corresponding to a high ratio of nationality to be displayed for a long display time or with a high frequency, and
wherein the information output device is arranged at each booth in an immigration checkpoint,
the information output device includes an information processing unit configured to adjust display languages and display conditions of the guidance information on the basis of the guidance information received from the information provision server, and
the information processing unit adjusts display conditions in proportion to a ratio of passengers with each nationality on the basis of the nationality information of passengers in each of the transport means and adjusts the display conditions to differentially assign the number of booths to each display language in proportion to the ratio of passengers with each nationality and adjusts the greatest number of booths to be assigned to a nationality corresponding to the highest ratio of passengers with each nationality.

15. The multilingual information guidance system of claim 14,
wherein the information processing unit outputs the guidance information in the form of voice signals set in the display language.

16. An information output device that performs multilingual information guidance, comprising:
a storage device in which a guidance information output application for outputting guidance information in many languages is installed; and
a processor configured to execute the guidance information output application,
wherein the information output device is arranged on a common exit path used by passengers of different transport means,
wherein the processor outputs guidance information prepared in the native language corresponding to nationality information of a plurality of users, which is read from an RFID tag carried by the plurality of users or transmitted from an information provision server when the guidance information output application is executed,
the processor sets display conditions of display languages of the guidance information according to a ratio of nationality of the plurality of users and sets a display language corresponding to a high ratio of nationality to be displayed for a long display time or with a high frequency,
wherein the processor adjusts the display languages and display conditions of the guidance information on the basis of the guidance information received from the information provision server, and
wherein the processor calculates an average movement time of passengers with respect to a walking distance including an independent getting-off zone for each transport means and the common exit path, and adjusts a time for terminating display of the guidance information on the basis of the arrival time information of each of the transport means and the average movement time of the passengers with respect to the walking distance, and adjusts display languages and display conditions of the guidance information on the basis of nationality information of passengers of the transport means when departure or arrival of a transport means is determined according to the arrival time information.

17. The information output device of claim 16, further comprising:
an RFID reader configured to read nationality information or departure point/destination information of one or more users from boarding passes each including an RFID tag in which the nationality information or departure point/destination information is stored when the plurality of users approach a communication range,
wherein the processor adjusts display languages and display conditions of the guidance information on the basis of the nationality information or departure point/destination information read from the one or more boarding passes.

18. The information output device of claim 17, further comprising:
a barcode reader configured to read departure point/destination information stored in a barcode of the boarding passes in which the departure point/destination information is stored,
wherein the processor sets at least one of languages of countries corresponding to the departure point/destination information read from the barcode as a display language.

* * * * *